United States Patent
Wang et al.

(10) Patent No.: US 12,434,993 B2
(45) Date of Patent: Oct. 7, 2025

(54) COPPER ION-DOPED POLYCHROMATIC FLUORESCENT GLASS AND PREPARATION METHOD AND USE THEREOF

(71) Applicant: SUN YAT-SEN UNIVERSITY, Guangdong (CN)

(72) Inventors: Jing Wang, Guangdong (CN); Shuaichen Si, Guangdong (CN); Weijiang Gan, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 796 days.

(21) Appl. No.: 17/780,525

(22) PCT Filed: Jun. 29, 2021

(86) PCT No.: PCT/CN2021/103227
§ 371 (c)(1),
(2) Date: May 27, 2022

(87) PCT Pub. No.: WO2022/236942
PCT Pub. Date: Nov. 17, 2022

(65) Prior Publication Data
US 2023/0278909 A1    Sep. 7, 2023

(30) Foreign Application Priority Data

May 11, 2021 (CN) .......................... 202110512252.2

(51) Int. Cl.
| | | |
|---|---|---|
| *C03C 3/062* | (2006.01) | |
| *C03B 11/12* | (2006.01) | |
| *C03C 4/12* | (2006.01) | |
| *C09K 11/58* | (2006.01) | |
| *H10H 20/01* | (2025.01) | |
| *H10H 20/851* | (2025.01) | |

(52) U.S. Cl.
CPC ............. *C03C 3/062* (2013.01); *C03B 11/122* (2013.01); *C03C 4/12* (2013.01); *C09K 11/58* (2013.01); *H10H 20/8512* (2025.01); *H10H 20/0361* (2025.01)

(58) Field of Classification Search
CPC ........... C09K 11/58; C03C 3/062; C03C 4/12; C03B 11/122; H10H 20/0361; H10H 20/8512
See application file for complete search history.

(56) References Cited

U.S. PATENT DOCUMENTS

2015/0230476 A1* 8/2015 Bookbinder ........... A01N 25/00
424/602

FOREIGN PATENT DOCUMENTS

| CN | 109761499 | 5/2019 |
|---|---|---|
| CN | 110642517 | 1/2020 |
| CN | 110804233 | 2/2020 |
| CN | 111808606 | 10/2020 |
| IN | 108423984 | 8/2018 |
| JP | 2014133682 | 7/2014 |
| WO | 2013172619 | 11/2013 |

OTHER PUBLICATIONS

"International Search Report (Form PCT/ISA/210) of PCT/CN2021/103227", mailed on Jan. 26, 2022, pp. 1-5.
O. Soriano-Romero et al., "Cold bluish white and blue emissions in Cu+-doped zinc phosphate glasses", Journal of Luminescence, vol. 217, Jan. 2020, pp. 1-7.

* cited by examiner

*Primary Examiner* — C Melissa Koslow
(74) *Attorney, Agent, or Firm* — JCIPRNET

(57) ABSTRACT

A copper ion-doped polychromatic fluorescent glass and a preparation method and use thereof are provided. The fluorescent glass has a chemical formula shown as the following: $aP_2O_5\text{-}bSiO_2\text{-}cZnO\text{-}dCs_2CO_3\text{-}eNaCl\text{-}fCuCl$, wherein a, b, c, d, e, and f in the formula represent the molar coefficients of compounds, wherein a is 45 to 65, b is 10 to 30, c is 1 to 5, d is 5 to 20, e is 5 to 20, f is 0.1 to 5. The fluorescent can achieve blue, orange and near-infrared photoluminescence under the UV light with higher fluorescent quantum yield.

14 Claims, 3 Drawing Sheets

COPPER ION-DOPED POLYCHROMATIC FLUORESCENT GLASS AND PREPARATION METHOD AND USE THEREOF

CROSS-REFERENCE TO RELATED APPLICATION

This application is a 371 of international application of PCT application serial no. PCT/CN2021/103227, filed on Jun. 29, 2021, which claims the priority benefit of China application no. 202110512252.2, filed on May 11, 2021. The entirety of each of the above mentioned patent applications is hereby incorporated by reference herein and made a part of this specification.

TECHNICAL FIELD

The present invention relates to the technical field of LED fluorescent glass, and more particularly relates to a copper ion-doped polychromatic fluorescent glass and a preparation method and use thereof.

RELATED ART

As a novel solid light source, LED has been developed into the fourth generation light source due to its characteristics of high efficiency, environmental protection and energy saving. However, the high input current would lead to the high junction temperature of device, which would therefore lead to the aging of LED chips, fluorescent powder and packaging materials, and thus leading to the decrease of luminous efficiency, shorter service life and color shift of white LED devices.

In the field of LED, the most potential replacement for fluorescent powder and epoxy resin package is fluorescent glass. The fluorescent glass not only has a luminous property same as the fluorescent powder, but also has the advantages of glass substrates such as heat resistance, corrosion resistance, high thermal conductivity, and low thermal expansion coefficient. Simultaneously, the fluorescent glass which has good machining property can be processed into various shapes, and the preparation process thereof is relatively simple with low energy consumption. At present, it has been reported by the article (Sr A, Lm A, MR B, et al. Cold bluish white and blue emissions in Cu+-doped zinc phosphate glasses[J]. Journal of Luminescence, 217.) that a monovalent copper ion fluorescent glass is composed of 40% zinc oxide, 60% phosphorus pentoxide and 0.5% cuprous chloride, but it can be seen from the result that the fluorescent glass has blue emission only of which the application scenarios are limited.

SUMMARY OF INVENTION

In order to overcome the above-mentioned drawbacks that the fluorescent glass has blue photoluminescence only, the present invention provides a copper ion-doped polychromatic fluorescent glass. By adjusting the ratio of different components, blue, orange and near-infrared emission can be achieved.

Another objective of the present invention is to provide a preparation method for the copper ion-doped polychromatic fluorescent glass.

Another objective of the present invention is to provide use of the copper ion-doped polychromatic fluorescent glass.

Another objective of the present invention is to provide a LED device prepared by the copper ion-doped polychromatic fluorescent glass.

In order to realize the above objectives, the technical solution used by the present invention is as follows.

A copper ion-doped polychromatic fluorescent glass, has a chemical formula shown as the following: $aP_2O_5$-$bSiO_2$-$cZnO$-$dCs_2CO_3$-$eNaCl$-$fCuCl$, wherein a, b, c, d, e, and f in the formula represent the molar coefficients of compounds, wherein a is 45 to 65, b is 10 to 30, c is 1 to 5, d is 5 to 20, e is 5 to 20, f is 0.1 to 5.

In the existing technology, the fluorescent glass using cuprous ions as the luminescence center can only achieve monochromatic photoluminescence such as blue, green, yellow or orange photoluminescence. This is because the components of the existing fluorescent glass cannot provide an ultrastrong coordination environment for the cuprous ions.

In the present invention, by adding $P_2O_5$, $SiO_2$, $ZnO$, $Cs_2CO_3$ and $NaCl$, the cuprous ions are allowed to obtain an ultrastrong coordination environment, and by adjusting the components, the fluorescent glass is subjected to a further red shift so as to achieve wide emission of three wave bands, i.e. blue, orange and near-infrared photoluminescence, under the excitation of UV light, and to achieve polychromatic photoluminescence with higher quantum yield.

Preferably, in the fluorescent glass, d is 5 to 10, f is 0.1 to 0.5, or d is 8 to 15, f is 2 to 3, or d is 10 to 20, f is 0.3 to 1.

When the fluorescent glass has the d being 5 to 10 and f being 0.1 to 0.5, quantum yield of the blue photoluminescence is higher.

When the fluorescent glass has the d being 8 to 15 and f being 2 to 3, quantum yield of the orange photoluminescence is the highest.

When the fluorescent glass has the d being 10 to 20 and f being 0.3 to 1, quantum yield of the near-infrared photoluminescence is the highest.

A preparation method for the fluorescent glass, includes the following steps:
step S1, weighing $P_2O_5$, $SiO_2$, $ZnO$, $Cs_2CO_3$, NaCl, CuCl and a reductant, and sufficiently grinding and mixing to form a mixture;
step S2, under a reducing atmosphere, melting the mixture at 1000° C. to 1300° C. for 5 to 60 minutes; and
step S3, pouring the melted mixture into a preheated mold, then annealing, cooling, cutting and polishing, thus obtaining the copper ion-doped polychromatic fluorescent glass.

The reductant is anhydrous oxalic acid or aluminum powder.

Preferably, in step S2, temperature of the melting is 1050° C. to 1200° C.

The temperature of the melting being 1050° C. to 1200° C. not only guarantees sufficient melting of the glass, but also guarantees $Cu^+$ from being oxidized. If $Cu^+$ is oxidized into $Cu^{2+}$ which is nonluminous, quenching of $Cu^+$ luminescence would be resulted.

Preferably, in step S2, the melting lasts for 10 to 30 minutes.

10 to 30 minutes of melting can not only guarantees sufficient melting of the glass, but also guarantees $Cu^+$ from being oxidized. If $Cu^+$ is oxidized into $Cu^{2+}$ which is nonluminous, quenching of $Cu^+$ luminescence would be resulted.

Preferably, in step S2, the reducing atmosphere is provided by carbon blocks, with the purpose of preventing $Cu^+$ from being oxidized into $Cu^{2+}$ during the high-temperature melting which would result in quenching of $Cu^+$ luminescence.

Preferably, in step S3, temperature of the annealing is 320° C. to 450° C.

It has been proved by a large number of experiments that temperature of the annealing being 350° C. to 400° C. can effectively eliminate the inner stress of the glass so as to prevent the glass from broken.

Preferably, in step S1, the grinding lasts for 0.5 to 1 hour. 0.5 to 1 hour of grinding allows uniform mixing of the raw materials.

The present invention further claims use of the copper ion-doped polychromatic fluorescent glass in luminescence conversion materials.

The copper ion-doped polychromatic fluorescent glass has the characteristics of high thermal conductivity, good heat-resistance, uniform luminescence, simple preparation process, and etc., which has good effect when applied in the luminescence conversion materials.

Use of the copper ion-doped polychromatic fluorescent glass in single host white-light illumination, near-infrared venography, infrared night-vision scope or food testing.

The fluorescent glass of the present invention can realize blue and orange photoluminescence simultaneously and thus can realize single host white-light illumination by adjusting the excitation wavelength. Since the fluorescent glass can achieve near-infrared emission with high quantum yield, the use thereof in near-infrared venography, infrared night-vision scope or food testing is found to be good.

A LED device includes a photoconverter and a LED chip, and the photoconverter includes the copper ion-doped polychromatic fluorescent glass.

It is found by the present invention that compared with the conventional LED powder packaged with epoxy resin, the LED device prepared by the copper ion-doped polychromatic fluorescent glass has high thermal conductivity and chemical stability.

Compared with the prior art, the beneficial effect of the present invention is as follows.

The present invention provides a copper ion-doped polychromatic fluorescent glass, wherein by adjusting the components and contents thereof in the fluorescent glass, the obtained copper ion-doped polychromatic fluorescent glass can realize emission of three wave bands, i.e. blue, orange and near-infrared emission. Particularly, the excitation wavelength of blue emission is 250 to 350 nm, the best excitation is 300 nm, the emission wavelength coverage is 400 to 550 nm, and the main emitting peak is located at 460 nm; the excitation wavelength of orange emission is 250 to 400 nm, the best excitation is 325 nm, the emission wavelength coverage is 400-800 nm, and the main emitting peak is located at 600 nm; the excitation wavelength of near-infrared emission is 250 to 450 nm, the best excitation is 365 nm, the emission wavelength coverage is 500 to 1250 nm, and the main emitting peak is located at 770 nm. The lowest quantum yield is 34.8% for blue light, 30.9% for orange light and 18.8% for near-infrared light.

DESCRIPTION OF EMBODIMENTS

Figure 1:
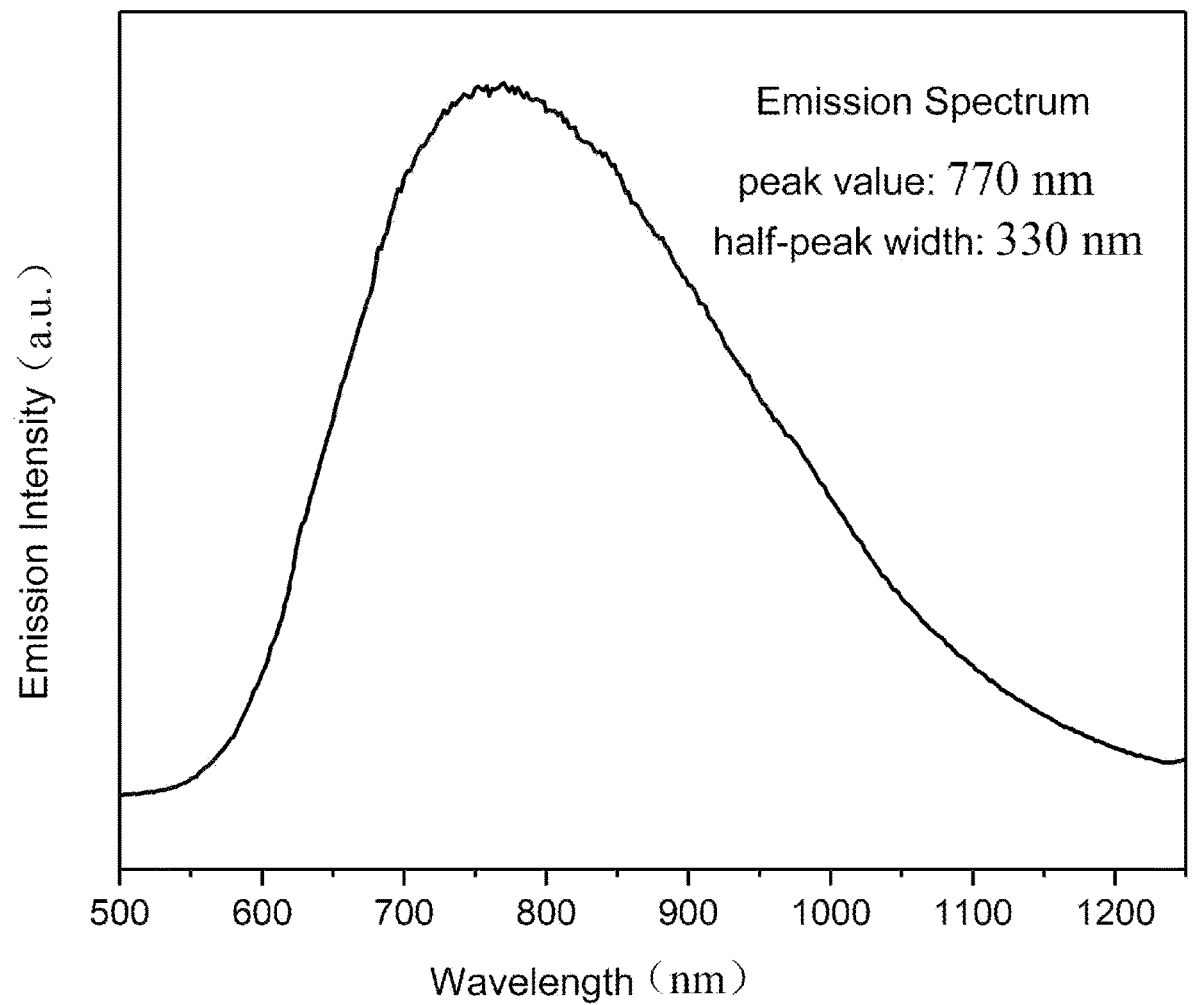
FIG. 1 is an emission spectrum of a fluorescent glass prepared in Example 12.

The technical solutions of the examples of the present invention are clearly and entirely described in the following, but implementations of the present invention are not limited thereto.

Unless specified, reagents, methods and equipment used in the present invention are conventional reagents, methods and equipment in the art.

Example 1

A copper ion-doped polychromatic fluorescent glass was provided by the present example, having a chemical formula as follows: $aP_2O_5$-$bSiO_2$-$cZnO$-$dCs_2CO_3$-$eNaCl$-$fCuCl$, and a preparation method thereof included the following steps:

step S1, $P_2O_5$, $SiO_2$, ZnO, $Cs_2CO_3$, NaCl, CuCl and a reductant were weighed, and sufficiently grinded and mixed for 0.5 hour to form a mixture;

step S2, under a reducing atmosphere, the mixture was melted at 1100° C. for 30 minutes; and step S3, the melted mixture was poured into a preheated mold, then annealed at 350° C. for 2 hours, after cooling, cutting and polishing, thus the copper ion-doped polychromatic fluorescent glass was obtained. Specific formulation is shown in Table 1.

Examples 2 to 10

A series of copper ion-doped polychromatic fluorescent glass was provided by the examples, having a chemical formula as follows: $aP_2O_5$-$bSiO_2$-$cZnO$-$dCs_2CO_3$-$eNaCl$-$fCuCl$, and the preparation method was the same as that of Example 1. Specific formulation is shown in Table 1.

TABLE 1

| Formulation of Examples 1 to 10 | | | | | | | | | | |
| --- | --- | --- | --- | --- | --- | --- | --- | --- | --- | --- |
| | Example 1 | Example 2 | Example 3 | Example 4 | Example 5 | Example 6 | Example 7 | Example 8 | Example 9 | Example 10 |
| $P_2O_5$ | 55 | 55 | 55 | 55 | 55 | 55 | 55 | 55 | 55 | 55 |
| $SiO_2$ | 20 | 20 | 20 | 20 | 20 | 20 | 20 | 20 | 20 | 20 |
| ZnO | 3 | 3 | 3 | 3 | 3 | 3 | 3 | 3 | 3 | 3 |
| NaCl | 12 | 12 | 12 | 12 | 12 | 12 | 12 | 12 | 12 | 12 |
| $Cs_2CO_3$ | 5 | 8 | 10 | 8 | 8 | 8 | 12 | 15 | 12 | 12 |
| CuCl | 0.2 | 0.2 | 0.2 | 0.1 | 0.5 | 2.5 | 2.5 | 2.5 | 2 | 3 |

Examples 11 to 17

A series of copper ion-doped polychromatic fluorescent glass was provided by the examples, having a chemical formula as follows: $aP_2O_5$-$bSiO_2$-$cZnO$-$dCs_2CO_3$-$eNaCl$-$fCuCl$, and the preparation method was the same as that of Example 1. Specific formulation is shown in Table 2.

TABLE 2

Formulation of Examples 11 to 17

|  | Example 11 | Example 12 | Example 13 | Example 14 | Example 15 | Example 16 | Example 17 |
|---|---|---|---|---|---|---|---|
| $P_2O_5$ | 55 | 55 | 55 | 55 | 55 | 45 | 65 |
| $SiO_2$ | 20 | 20 | 20 | 20 | 20 | 30 | 10 |
| ZnO | 3 | 3 | 3 | 3 | 3 | 1 | 5 |
| NaCl | 12 | 12 | 12 | 12 | 12 | 20 | 5 |
| $Cs_2CO_3$ | 10 | 15 | 20 | 15 | 15 | 5 | 20 |
| CuCl | 0.6 | 0.6 | 0.6 | 0.3 | 1 | 5 | 0.1 |

Example 18

A copper ion-doped polychromatic fluorescent glass provided by Example 18 had the same components and preparation method as those of Example 1, only with the difference in the temperature for melting of step S2, i.e., the temperature for melting in Example 18 is 1100° C.

Example 19

A copper ion-doped polychromatic fluorescent glass provided by Example 19 had the same components and preparation method as those of Example 1, only with the difference in the temperature for melting of step S2, i.e., the temperature for melting in Example 19 is 1300° C.

Comparative Examples 1 to 4

A series of fluorescent glass was provided by Comparative Examples 1 to 4, having a chemical formula as follows: $aP_2O_5$-$bSiO_2$-$cZnO$-$dCs_2CO_3$-$eNaCl$-$fCuCl$, and the preparation method of Comparative Examples 1 to 4 was the same as that of Example 1, only with the difference in formulation. Specific formulation is shown in Table 3.

TABLE 3

Formulation of Comparative Examples 1 to 4 (part)

|  | Comparative Example 1 | Comparative Example 2 | Comparative Example 3 | Comparative Example 4 |
|---|---|---|---|---|
| $P_2O_5$ | 55 | 55 | 55 | 55 |
| $SiO_2$ | 20 | 20 | 20 | 20 |
| ZnO | 3 | 3 | 3 | 3 |
| NaCl | 12 | 12 | 12 | 12 |
| $Cs_2CO_3$ | 10 | 10 | 3 | 25 |
| CuCl | 8 | 0.05 | 0.5 | 0.5 |

Test Results

The above examples and comparative examples were all subjected to the fluorescent quantum yield test. The test was performed by using the absolute quantum yield spectrometer C13534, from HAMAMATSU. The excitation wavelengths were 300 nm (blue), 320 nm (orange) and 365 nm (near-infrared). Emission intensity at the corresponding waveband (280 to 600 nm for blue, 300 to 800 nm for orange, 350 to 1300 nm for near-infrared) of the reference sample (a blank cuvette was selected in the test) was first tested, and emission intensity at the corresponding waveband of the samples were then tested. Results of the quantum yield were given directly by the spectrometer.

TABLE 3

Data of Examples and Comparative Examples

|  | Fluorescent quantum yield |
|---|---|
| Example 1 | 64.7% (blue) |
| Example 2 | 65.8% (blue) |
| Example 3 | 34.8% (blue) |
| Example 4 | 76.0% (blue) |
| Example 5 | 68.0% (blue) |
| Example 6 | 52.7% (orange) |
| Example 7 | 56.0% (orange) |
| Example 8 | 53.7% (orange) |
| Example 9 | 54.8% (orange) |
| Example 10 | 60.1% (orange) |
| Example 11 | 27.0% (near infrared) |
| Example 12 | 22.1% (near infrared) |
| Example 13 | 27.4% (near infrared) |
| Example 14 | 23.2% (near infrared) |
| Example 15 | 24.5% (near infrared) |
| Example 16 | 30.9% (orange) |
| Example 17 | 18.8% (near infrared) |
| Example 18 | 54.7% (blue) |
| Example 19 | 44.7% (blue) |
| Comparative Example 1 | 2.7% (orange) |
| Comparative Example 2 | 10.8% (blue) |
| Comparative Example 3 | 15.7% (blue) |
| Comparative Example 4 | 1.6% (near infrared) |

It can be seen from Examples 1 to 5 that when the fluorescent glass has the d being 5 to 10 and f being 0.1 to 0.5, the quantum yield of blue photoluminescence is higher. It can be seen from Examples 6 to 10 that when the fluorescent glass has the d being 8 to 15 and f being 2 to 3, the quantum yield of orange photoluminescence is the highest. It can be seen from Examples 11 to 15 that when the fluorescent glass has the d being 10 to 20 and f being 0.3 to 1, quantum yield of the near-infrared photoluminescence is the highest.

It can be seen from Comparative Examples 1 to 4 that the quantum yield is low when the components of fluorescent glass are not within the range, making it unable to be used.

It can be seen from FIG. 1 that the fluorescent glass can achieve near-infrared emission under the UV light, and application scenarios of the fluorescent glass are widely expanded, such as in the fields of near-infrared venography, infrared night-vision scope or food testing.

Figure 2:
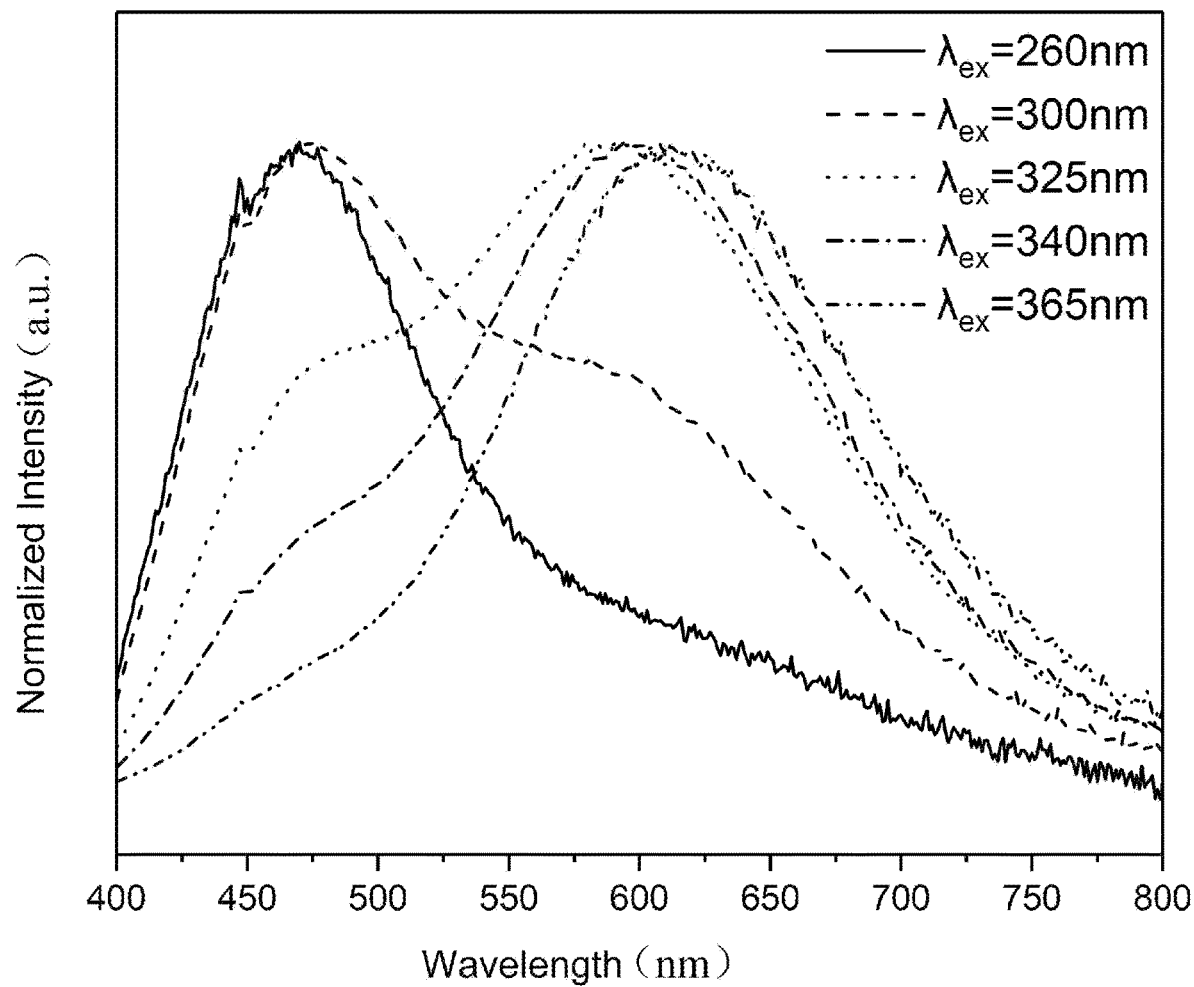
FIG. 2 is an emission spectra of a fluorescent glass prepared in Example 7.

It can be seen from FIG. 2 that under the UV light, the fluorescent glass prepared by Example 7 can realize blue and orange emission simultaneously, and with the red shift of the excitation wavelength, ratio of the orange emission increase gradually with respect to the blue emission. Under the excitation of 310 to 350 nm waveband, it is expected to realize single host white-light illumination.

Figure 3:
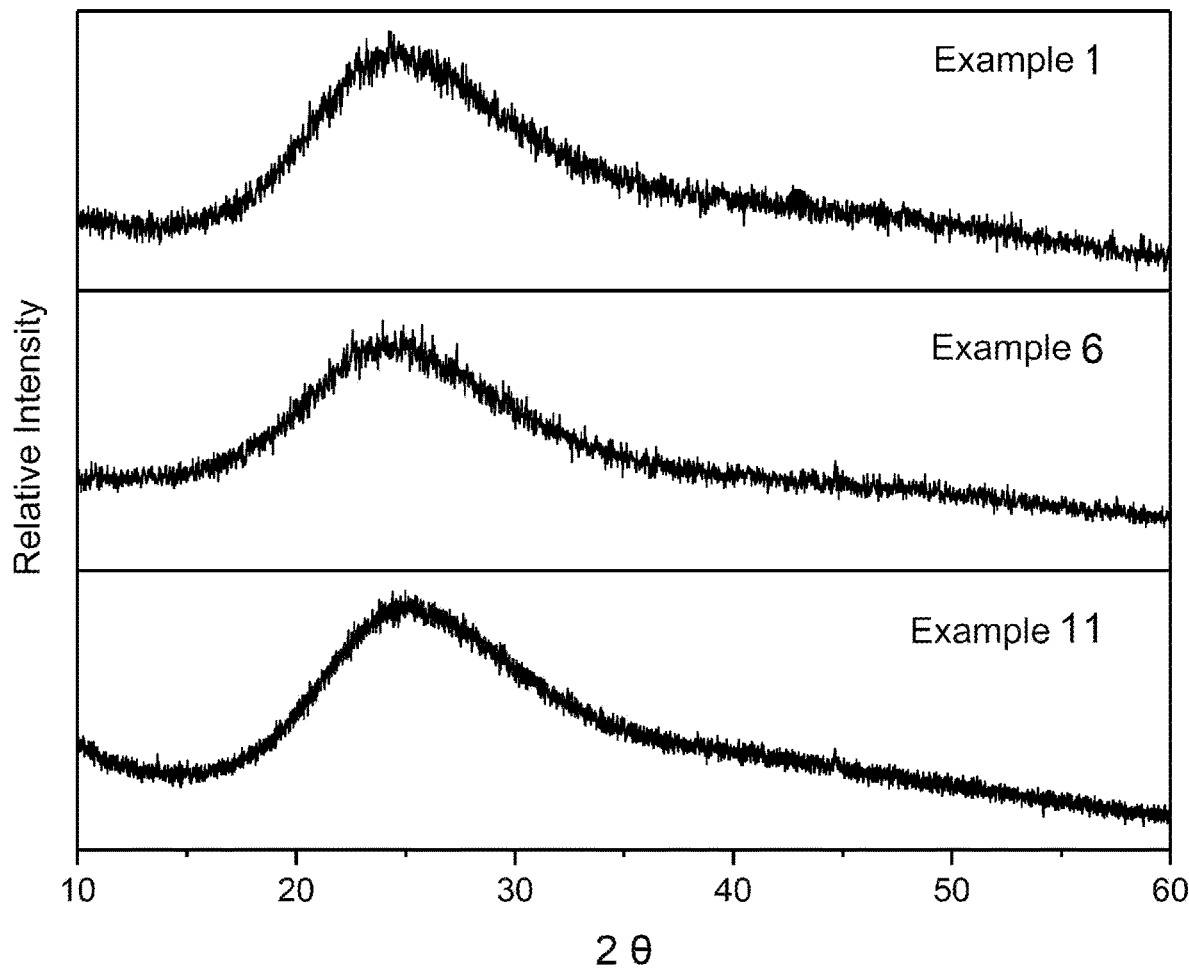
FIG. 3 is an XRD graph of fluorescent glass prepared in Examples 1, 6 and 11.

The microcrystal phase probably existing in the glass may cause an effect on the coordination environment for Cu+, thereby affecting its quantum yield. It can be seen from FIG. 3 that there's only one hump of the amorphous phase in the XRD graph, demonstrating that there's no microcrystal phase in the fluorescent glass.

Apparently, the above examples of the present invention are only an example to clearly illustrate the invention, not a limitation of the implementation of the present invention. For those of ordinary skill in the art, other variation or changes in different forms can be made on the basis of the above description. It is unnecessary and impossible to enumerate all the implementations here. Any modification, equivalent replacement and improvement made within the spirit and principles of the present invention shall be included in the protection scope of the claims of the invention.

What is claimed is:

1. A copper ion-doped polychromatic fluorescent glass, wherein it has a chemical formula shown as the following:

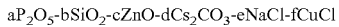

$aP_2O_5\text{-}bSiO_2\text{-}cZnO\text{-}dCs_2CO_3\text{-}eNaCl\text{-}fCuCl$ wherein a, b, c, d, e, and f in the formula represent the molar coefficients of compounds, wherein a is 45 to 65, b is 10 to 30, c is 1 to 5, d is 5 to 20, e is 5 to 20, f is 0.1 to 5.

2. The copper ion-doped polychromatic fluorescent glass according to claim 1, wherein in the fluorescent glass, d is 5 to 10, f is 0.1 to 0.5, or d is 8 to 15, f is 2 to 3, or d is 10 to 20, f is 0.3 to 1.

3. A preparation method for the copper ion-doped polychromatic fluorescent glass according to claim 1, wherein the preparation method comprises the following steps:
step S1, weighing $P_2O_5$, $SiO_2$, ZnO, $Cs_2CO_3$, NaCl, CuCl and a reductant, and sufficiently grinding and mixing to form a mixture;
step S2, under a reducing atmosphere, melting the mixture at 1000° C. to 1300° C. for 5 to 60 minutes; and
step S3, pouring the melted mixture into a preheated mold, then annealing, cooling, cutting and polishing, thus obtaining the copper ion-doped polychromatic fluorescent glass.

4. The preparation method for the copper ion-doped polychromatic fluorescent glass according to claim 3, wherein in step S2, temperature of the melting is 1050° C. to 1200° C.

5. The preparation method for the copper ion-doped polychromatic fluorescent glass according to claim 3, wherein in step S2, the melting lasts for 10 to 30 minutes.

6. The preparation method for the copper ion-doped polychromatic fluorescent glass according to claim 3, wherein in step S2, the reducing atmosphere is provided by carbon blocks.

7. The preparation method for the copper ion-doped polychromatic fluorescent glass according to claim 3, wherein in step S3, temperature of the annealing is 320° C. to 450° C.

8. A LED device, comprising a photoconverter and a LED chip, wherein the photoconverter comprises the copper ion-doped polychromatic fluorescent glass according to claim 1.

9. A preparation method for the copper ion-doped polychromatic fluorescent glass according to claim 2, wherein the preparation method comprises the following steps:
step S1, weighing $P_2O_5$, $SiO_2$, ZnO, $Cs_2CO_3$, NaCl, CuCl and a reductant, and sufficiently grinding and mixing to form a mixture;
step S2, under a reducing atmosphere, melting the mixture at 1000° C. to 1300° C. for 5 to 60 minutes; and
step S3, pouring the melted mixture into a preheated mold, then annealing, cooling, cutting and polishing, thus obtaining the copper ion-doped polychromatic fluorescent glass.

10. The preparation method for the copper ion-doped polychromatic fluorescent glass according to claim 9, wherein in step S2, temperature of the melting is 1050° C. to 1200° C.

11. The preparation method for the copper ion-doped polychromatic fluorescent glass according to claim 9, wherein in step S2, the melting lasts for 10 to 30 minutes.

12. The preparation method for the copper ion-doped polychromatic fluorescent glass according to claim 9, wherein in step S2, the reducing atmosphere is provided by carbon blocks.

13. The preparation method for the copper ion-doped polychromatic fluorescent glass according to claim 9, wherein in step S3, temperature of the annealing is 320° C. to 450° C.

14. A LED device, comprising a photoconverter and a LED chip, wherein the photoconverter comprises the copper ion-doped polychromatic fluorescent glass according to claim 2.

* * * * *